(12) United States Patent
Budideti et al.

(10) Patent No.: US 12,534,467 B2
(45) Date of Patent: Jan. 27, 2026

(54) PROCESS FOR THE PREPARATION OF ACALABRUTINIB

(71) Applicant: NATCO PHARMA LIMITED, Hyderabad (IN)

(72) Inventors: Shankar Reddy Budideti, Hyderabad (IN); Srinivasa Krishna Murthy Konduri, Hyderabad (IN); Jagan Mohan Reddy Sanapureddy, Hyderabad (IN); Ravi Kumar Remella, Hyderabad (IN); Sandeep Kumar Thoota, Hyderabad (IN); Sunitha Kothamunireddygari, Hyderabad (IN); Pulla Reddy Muddasani, Hyderabad (IN); Venkaiah Chowdary Nannapaneni, Hyderabad (IN)

(73) Assignee: NATCO PHARMA LIMITED, Hyderabad (IN)

( * ) Notice: Subject to any disclaimer, the term of this patent is extended or adjusted under 35 U.S.C. 154(b) by 835 days.

(21) Appl. No.: 17/781,570

(22) PCT Filed: Dec. 1, 2020

(86) PCT No.: PCT/IN2020/050992
§ 371 (c)(1),
(2) Date: Jun. 1, 2022

(87) PCT Pub. No.: WO2021/111465
PCT Pub. Date: Jun. 10, 2021

(65) Prior Publication Data
US 2023/0081911 A1 Mar. 16, 2023

(30) Foreign Application Priority Data
Dec. 2, 2019 (IN) .............................. 201941049484

(51) Int. Cl.
*C07D 487/04* (2006.01)
*A61K 31/4985* (2006.01)

(52) U.S. Cl.
CPC ........ *C07D 487/04* (2013.01); *A61K 31/4985* (2013.01)

(58) Field of Classification Search
CPC .................................................. C07D 487/04
USPC ....................................................... 544/350
See application file for complete search history.

(56) References Cited

U.S. PATENT DOCUMENTS 9,290,504 B2    3/2016   Barf et al.

FOREIGN PATENT DOCUMENTS

| CN | 109053780 A | 12/2018 |
|---|---|---|
| WO | 2013/010868 A1 | 1/2013 |
| WO | 2017/002095 A1 | 1/2017 |
| WO | 2018191815 A1 | 10/2018 |
| WO | 2019090269 A1 | 5/2019 |

*Primary Examiner* — Douglas M Willis
(74) *Attorney, Agent, or Firm* — Dickinson Wright PLLC

(57) ABSTRACT

The present invention relates to an improved and industrially viable process for the preparation of Acalabrutinib and its Intermediates. The present invention involves less expensive reagents, solvents and the process conditions can be easily adopted for commercial scale. The present invention relates to process for the preparation Acalabrutinib of formula (1) and process for the preparation of Acalabrutinib key starting material.

Formula (1)

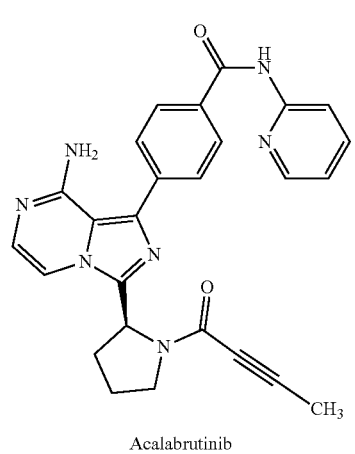

Acalabrutinib (7)

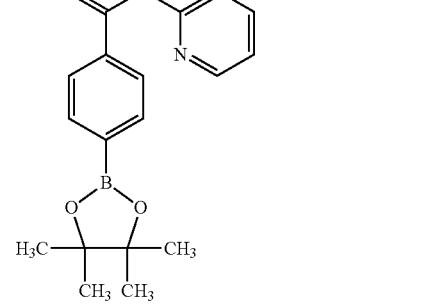

6 Claims, No Drawings

PROCESS FOR THE PREPARATION OF ACALABRUTINIB

FIELD OF THE INVENTION

The present invention relates to an improved and industrially viable process for the preparation of Acalabrutinib and its Intermediates. The present invention involves less expensive reagents, solvents and the process conditions can be easily adopted for commercial scale. The present invention relates to process for the preparation Acalabrutinib of formula (1) and its key starting material and process for the preparation of Acalabrutinib dihydrate.

BACKGROUND OF THE INVENTION

Acalabrutinib is an inhibitor of Bruton tyrosine kinase, chemically known as 4-{8-amino-3-[(2S)-1-(but-2-ynoyl)pyrrolidin-2-yl]imidazo[1,5-a]pyrazin-1-yl}-N-(pyridine-2-yl)benzamide and structurally represent as below.

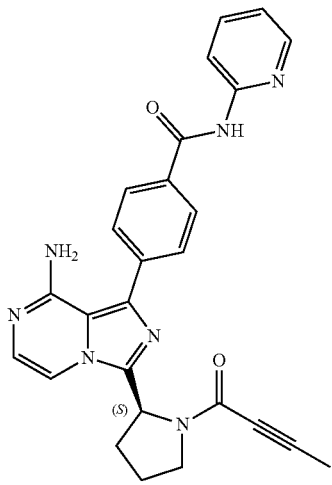

Formula (1)

Acalabrutinib is sold under the brand name CALQUENCE® and it is indicated for the treatment of mantle cell lymphoma.

Preparation of Acalabrutinib is disclosed in WO2013010868 (U.S. Pat. No. 9,290,504) (Scheme-1). According to process, (3-chloropyrazin-2-yl)methanamine hydrochloride is condensed with Cbz protected L-proline (Z-Pro-OH) in the presence of HATU and triethylamine to afford (S)-benzyl 2-((3-chloropyrazin-2-yl)methylcarbamoyl)pyrrolidine-1-carboxylate which is then intra molecularly cyclized in the presence of phosphorous oxychloride at elevated temperatures to afford (S)-Benzyl 2-(8-chloroimidazo[1,5-a]pyrazin-3-yl)pyrrolidine-1-carboxylate. Thereafter, (S)-Benzyl 2-(8-chloroimidazo[1,5-a]pyrazin-3-yl)pyrrolidine-1-carboxylate is brominated using NBS in DMF to afford (S)-Benzyl 2-(1-bromo-8-chloroimidazo[1,5-a]pyrazin-3-yl)pyrrolidine-1-carboxylate which is later subjected to amination using ammonia under pressure (4.5 bar) at 110° C. to afford (S)-Benzyl 2-(8-amino-1-bromoimidazo[1,5-a]pyrazin-3-yl)pyrrolidine-1-carboxylate. Later, (S)-Benzyl 2-(8-amino-1-bromoimidazo[1,5-a]pyrazin-3-yl)pyrrolidine-1-carboxylate is reacted with 4-(pyridin-2-yl-aminocarbonyl) benzeneboronic acid under Suzuki reaction conditions using catalytic amount of Pd(dppf)Cl$_2$ at ~140° C. under microwave conditions to afford (S)-Benzyl2-(8-amino-1-(4-(pyridin-2-ylcarbamoyl)phenyl)imidazo[1,5-a]pyrazin-3-yl) pyrrolidine-1-carboxylate. Thereafter, (S)-Benzyl 2-(8-amino-1-(4-(pyridin-2-ylcarbamoyl)phenyl)imidazo[1,5-a]pyrazin-3-yl) pyrrolidine-1-carboxylate is subjected to de-protection using hydrobromic acid in acetic acid to afford (S)-4-(8-Amino-3-(pyrrolidin-2-yl)imidazo[1,5-a]pyrazin-1-yl)-N-(pyridin-2-yl) benzamide. Finally, (S)-4-(8-Amino-3-(pyrrolidin-2-yl)imidazo[1,5-a]pyrazin-1-yl)-N-(pyridin-2-yl)benzamide is reacted with 2-butynoic acid in the presence of HATU and triethylamine in dichloromethane to afford Acalabrutinib of formula (1).

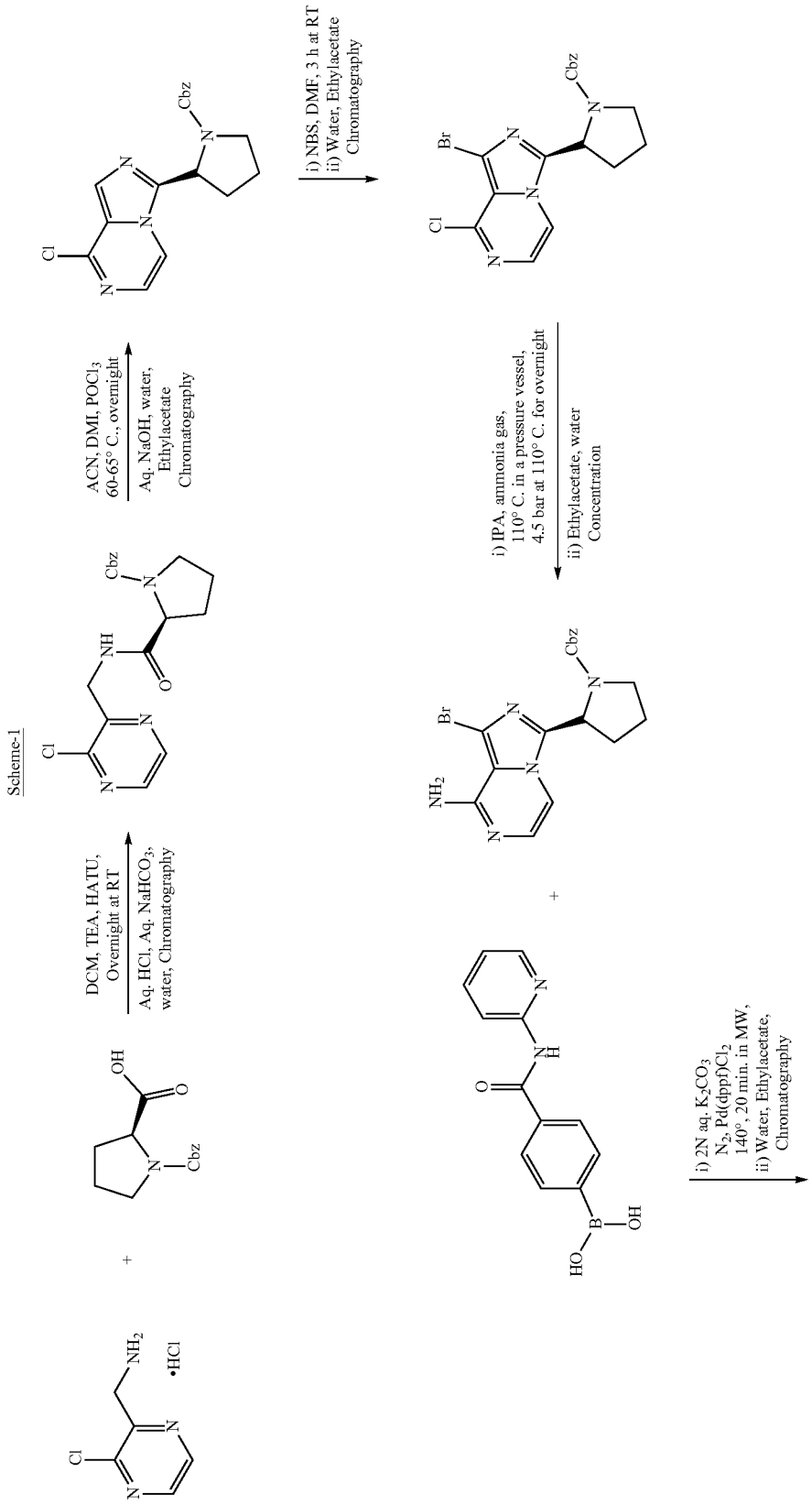

-continued
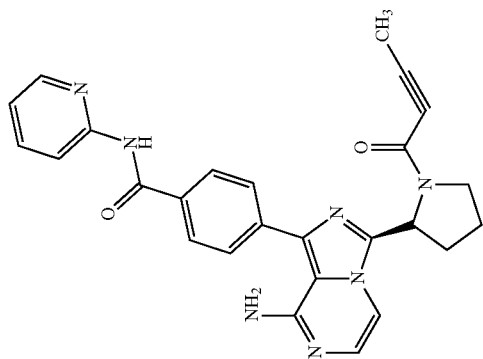
↑ TEA, DCM, HATU
ii) Water,
iii) Prep. HPLC
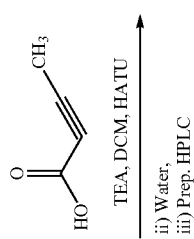
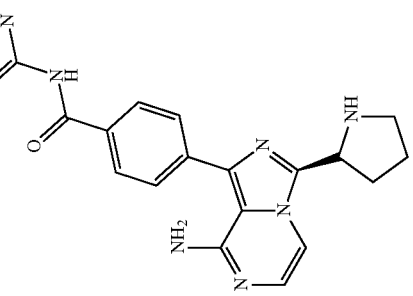
↑ i) 33% HBr in AcOH,
1 h at RT,
ii) DCM, water,
2N NaOH
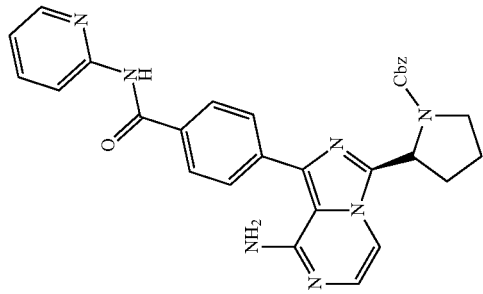

The process disclosed in WO2013010868 (U.S. Pat. No. 9,290,504) suffers from the following limitations that reduce its industrial applicability. For example:—
1. Process needs preparative HPLC and chromatographic purification techniques to purify the product. On higher scale production, preparative HPLC and chromatographic purification techniques are time consuming and not viable as it requires huge quantity of organic solvents. The output quantity would be very low and is unviable on commercial scale to meet the market demand.
2. Process requires cryogenic reaction conditions, which will be additional burden on commercial production.
3. Highly corrosive and irritant hydrobromic acid in acetic acid is required to deprotect Cbz functional group leads to formation of undesirable impurities.
4. Process requires microwave reaction conditions, which is industrially unviable.
5. Reported overall yield is very low.

WO2017002095 describes various crystalline forms I, II, III, IV, V, VI, VIII and amorphous forms of Acalabrutinib.

Further, there are literature methods available for key intermediate of compound of formula (7). One such methodology is disclosed in CN109053780 (Scheme-2). According to this patent, compound of formula (A) is converted to corresponding boronate ester of formula (B) using pinacol, which is then condensed with 2-aminopyridine in the presence of EDC hydrochloride and DMAP in dichloromethane to afford compound of formula (7).

The inventors of the present invention have developed an improved process for the preparation of Acalabrutinib and it's Intermediate. The present process is cost effective and feasible in large scale production also.

OBJECT OF THE INVENTION

The main objective of the present invention is to provide a process for the preparation of Acalabrutinib.

Another objective of the present invention is to provide a process, which is simple, economical and suitable for industrial scale up.

SUMMARY OF THE INVENTION

One Aspect of the present invention is to provide a process for the preparation of Acalabrutinib of formula (1) as depicted in below scheme-3.

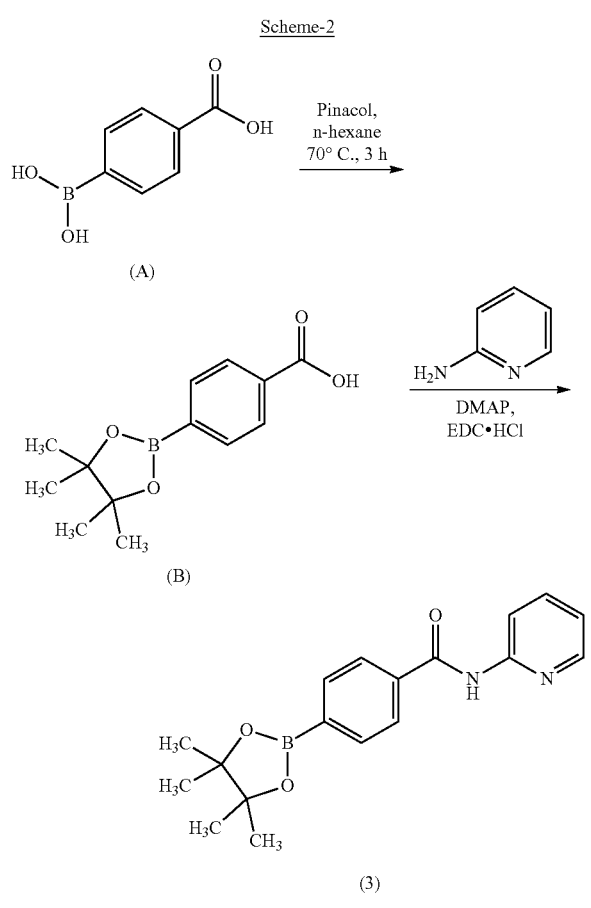

Scheme-2

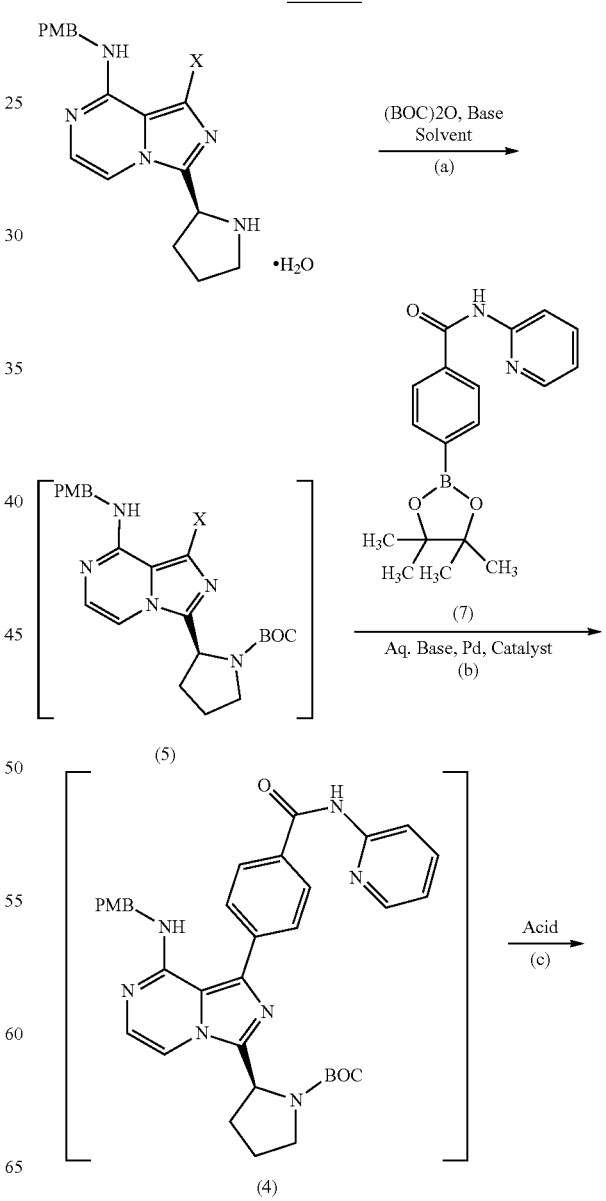

Scheme-3

-continued

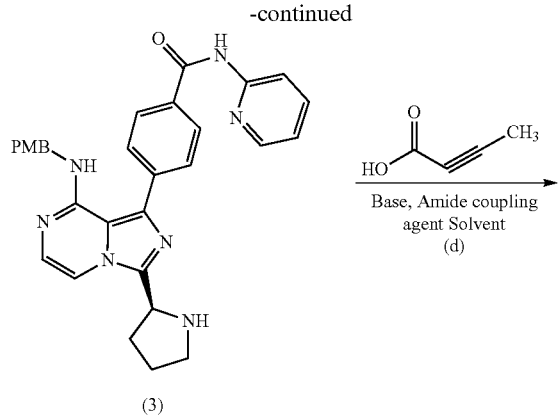

(3)

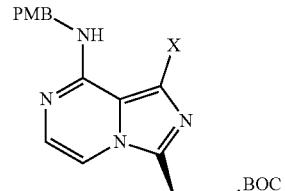

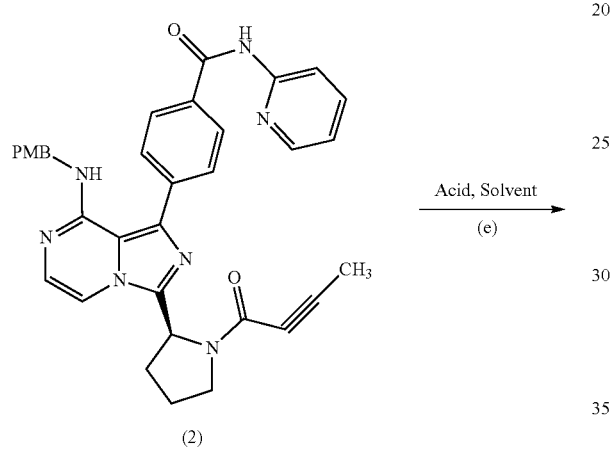

(2)

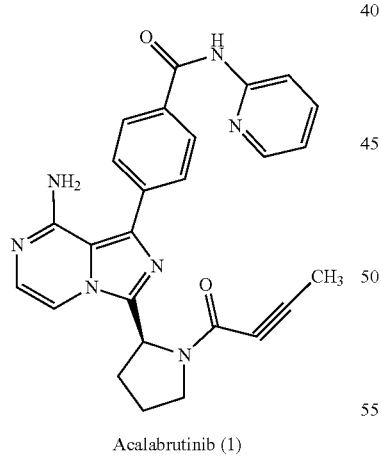

Acalabrutinib (1)

X = Chloro, Bromo, Iodo

Another aspect of the present invention is Compounds having the following structural general formulae used in process for the preparation of Acalabrutinib.

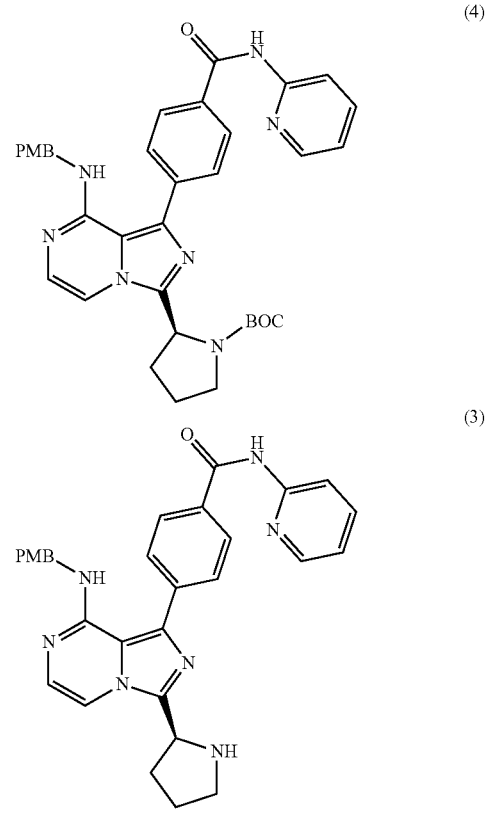

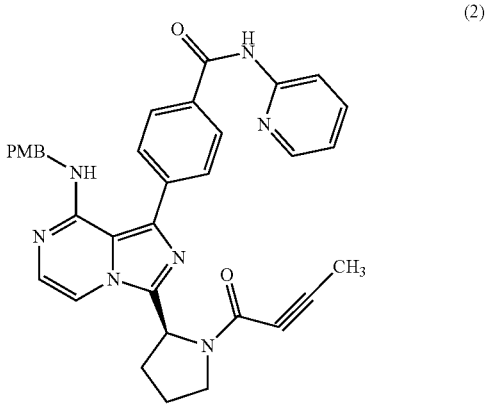

Wherein PMB is paramethoxy benzyl; X=Chloro, Bromo and Iodo

Yet another aspect of the present invention is to provide a process for the preparation of Key starting material (7) of Acalabrutinib as depicted in below scheme-4.

11

Scheme-4

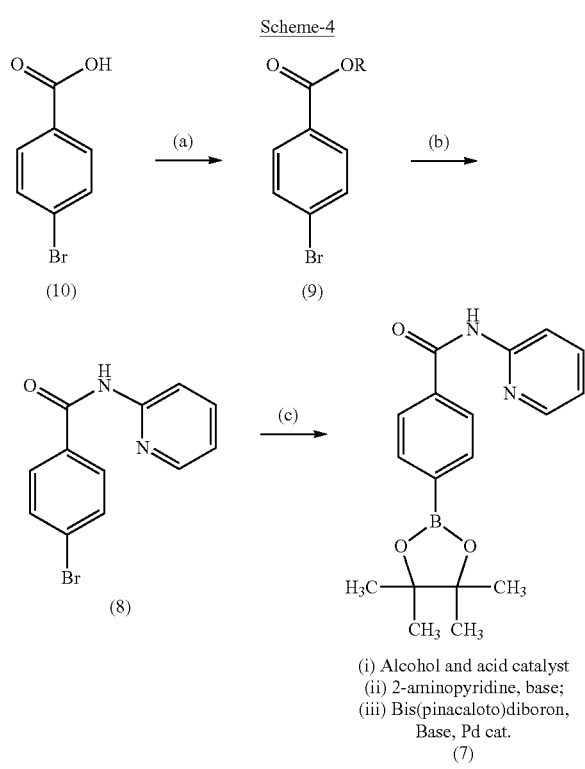

(i) Alcohol and acid catalyst
(ii) 2-aminopyridine, base;
(iii) Bis(pinacaloto)diboron, Base, Pd cat.

R = Methyl, Ethyl or Isopropyl

DETAILED DESCRIPTION OF THE INVENTION

One embodiment of the present invention is to provide a process for the preparation of Acalabrutinib of formula (1) comprising the steps of:
  a) reacting compound of formula (6) with boc anhydride in the presence of base to obtain compound of formula (5),
  b) reacting compound of formula (5) in-situ with compound of formula (7) in the presence of base and palladium catalyst in an aqueous organic solvent to obtain compound of formula (4),
  c) selectively deprotecting the compound of formula (4) in-situ with dilute or concentrated acid in an organic solvent to obtain compound of formula (3),
  d) reacting the compound of formula (3) with 2-Butynoic acid in presence of base and amide coupling agent in an organic solvent to obtain the compound of formula (2),
  e) deprotecting the compound of formula (2) to obtain the Acalabrutinib of formula (1),
  f) optionally purifying Acalabrutinib of formula (1) in a suitable solvent system to obtain pharmaceutically pure Acalabrutinib having more than 99% of HPLC purity.

In step (a) of the present invention, wherein the base is selected from organic base or inorganic base. The organic base may be selected from triethylamine, diisopropylethylamine, tertiary butylamine or any other equivalent organic base. The inorganic base may be selected from alkali and alkaline metal acetates or carbonates such as sodium acetate, sodium bicarbonate, sodium carbonate, potassium acetate, potassium bicarbonate, potassium carbonate, cesium carbonate, or any other equivalent base.

12

In step (b) of the present invention, wherein the base is selected from organic base or inorganic base. The organic base may be selected from triethylamine, diisopropylethylamine, tertiary butylamine or any other equivalent organic base. The inorganic base may be selected from alkali and alkaline metal acetates or carbonates such as sodium acetate, sodium bicarbonate, sodium carbonate, potassium acetate, potassium bicarbonate, potassium carbonate, cesium carbonate, or any other equivalent base.

In step (b) of the present invention, wherein the palladium catalyst is selected from Tetrakis(Triphenylphosphine)palladium(0)(Pd(PPh$_3$)$_4$), [1,1'Bis(diphenylphosphino) ferrocene]dichloropalladium(II) (Pd(dppf)Cl$_2$), [1,1'-Bis(diphenylphosphino)ferrocene] dichloro palladium(II). DCM complex (Pd(dppf)Cl$_2$. DCM complex), palladium (II) acetate (Pd(OAc)$_2$), palladium (II) chloride (PdCl$_2$), bis(Benzonitrile) palladium(II) dichloride (Pd(PhCN)$_2$Cl$_2$), bis(triphenylphosphine)palladium(II) dichloride (Pd(PPh$_3$)$_2$Cl$_2$), and allylpalladium(II) chloride dimer ([PdCl(C$_3$H$_5$)]$_2$). Specifically, the palladium catalyst may be selected from Tetrakis(Triphenylphosphine)palladium(0) (Pd(PPh$_3$)$_4$), [1,1'-Bis(diphenylphosphino) ferrocene]dichloropalladium(II) (Pd(dppf)Cl$_2$), [1,1'-Bis(diphenylphosphino)ferrocene] dichloropalladium(II). DCM complex (Pd(dppf)Cl$_2$. DCM complex).

In step (c) of the present invention, wherein the acid may be selected from organic or inorganic acid. The organic acid may be selected from methanesulfonic acid, trifluoroacetic acid, triflic acid, p-toluenesulfonic acid or any other suitable organic acid. The inorganic acid may be selected from dilute or concentrated hydrochloric acid, dilute or concentrated hydrobromic acid, HBr in acetic acid or any other suitable inorganic acid.

In step (d) of the present invention, wherein the base is selected from organic base or inorganic base. The organic base may be selected from triethylamine, diisopropylethylamine, tertiary butylamine or any other equivalent organic base. The inorganic base may be selected from alkali and alkaline metal acetates or carbonates such as sodium acetate, sodium bicarbonate, sodium carbonate, potassium acetate, potassium bicarbonate, potassium carbonate, cesium carbonate, or any other equivalent base.

In step (d) of the present invention, wherein the amide coupling reagent is selected from coupling reagents such as BOP reagent, PyBOP, HBTU, HATU, TBTU, EDCI, DCC, CDI, DIC, EDC. HCl, HOBt or any other suitable reagent.

In step (d) of the present invention, wherein the organic solvent is selected from dichloromethane, chloroform, toluene, ethylacetate, tetrahydrofuran, 1,4-dioxane, acetonitrile, DMF, DMAc, DMI, methyl THF, NMP, DMSO or mixture thereof.

In step (e) of the present invention, wherein the acid is selected from organic or inorganic acid. The organic acid may be selected from methanesulfonic acid, trifluoroacetic acid, triflic acid, p-toluenesulfonic acid, cyanuric acid or any other suitable organic acid. The inorganic acid may be selected from dilute or concentrated hydrochloric acid, dilute or concentrated hydrobromic acid, HBr in acetic acid, perchloric acid or ceric ammonium nitrate or any other suitable inorganic acid.

As per the present invention, wherein, Acalabrutinib of formula (1) is optionally purified from solvent selected from acetone, methanol, ethanol, isopropyl alcohol, 1,4-dioxane, dichloromethane, chloroform, acetonitrile, ethylacetate, toluene, water or any other suitable solvent or its mixture.

Another embodiment of the present invention is to provide a process for the preparation of Acalabrutinib intermediate of formula (7) comprising the steps of:

a) reacting 4-bromobenzoic acid of formula (10) with alcohol in the presence of acid catalyst to obtain compound of formula (9),
b) reacting compound of formula (9) with 2-aminopyridine in presence of base to obtain compound of formula (8),
c) reacting compound of formula (8) with Bis(pinacaloto) diboran to obtain compound of formula (7).

According to the present invention, in step (a) of the present invention, alcohol is selected from methanol, ethanol or isopropanol, the acid catalyst is selected form thionyl chloride, Oxalyl chloride, phosphorous oxychloride, concentrated hydrochloric acid, sulphuric acid, p-toluene sulfonic acid, methane sulfonic acid or any other suitable acid catalyst.

In step (b) of the present invention, wherein the base is selected from sodium methoxide, sodium ethoxide, sodium isopropoxide or any other suitable base and organic solvent selected from toluene, xylene or any other suitable solvent.

In step (c) of the present invention, wherein, the base is selected from organic base or inorganic base. The organic base may be selected from triethylamine, diisopropylethylamine, tertiary butylamine or any other equivalent organic base. The inorganic base may be selected from alkali or alkaline metal acetates, carbonates such as sodium acetate, sodium bicarbonate, sodium carbonate, potassium acetate, potassium bicarbonate, potassium carbonate, magnesium acetate, calcium acetate or any other equivalent base.

In step (c) of the present invention, wherein the palladium catalyst is selected from Tetrakis(Triphenylphosphine) palladium(0)(Pd(PPh$_3$)$_4$), [1,1'Bis(diphenylphosphino) ferrocene]dichloropalladium(II) (Pd(dppf)Cl$_2$), [1,1'-Bis (diphenylphosphino)ferrocene] dichloro palladium(II). DCM complex (Pd(dppf)Cl$_2$. DCM complex), palladium (II) acetate (Pd(OAc)$_2$), palladium (II) chloride (PdCl$_2$), bis(Benzonitrile) palladium(II) dichloride (Pd(PhCN)$_2$Cl$_2$), bis(triphenylphosphine)palladium(II) dichloride (Pd(PPh$_3$)$_2$Cl$_2$), and allylpalladium(II) chloride dimer ([PdCl(C$_3$H$_5$)]$_2$). Specifically, the palladium catalyst may be selected from Tetrakis(Triphenylphosphine)palladium(0) (Pd(PPh$_3$)$_4$), [1,1'-Bis(diphenylphosphino) ferrocene]dichloropalladium(II) (Pd(dppf)Cl$_2$), [1,1'-Bis(diphenylphosphino)ferrocene] dichloropalladium(II). DCM complex (Pd (dppf)Cl$_2$. DCM complex).

In step (c) of the present invention, wherein the solvent selected from DMF, DMSO, hexane, heptane, toluene, xylene, methyl t-butyl ether, Tetrahydrofuran, 2-methyl THF, 1,4-dioxane, dichloromethane, chloroform or any other suitable organic solvent.

Optionally compound of formula (7) can be purified from solvent selected from acetone, methanol, ethanol, isopropyl alcohol, acetonitrile, or any other suitable solvent or its mixture.

Advantages of the Present Invention a) The process of the present invention does not require chromatographic purification techniques like column chromatography, preparative HPLC or preparative TLC in any stage of the process.
b) The process of the present invention does not require cryogenic reaction conditions thereby reducing cost burden.
c) The process of the present invention avoids highly corrosive hydrobromic acid in acetic acid thereby reducing the environmental pollution load.
d) The process of the present invention does not require microwave reaction conditions.
e) The process of the present invention successfully adopts in-situ stage operation, simple work-up, isolation procedures and thereby improve the overall yield of Acalabrutinib of formula (1).

The present invention is further illustrated in detail with reference to following examples. It is desired that the examples be considered in all respect as illustrative and are not intended to limit the scope of the invention in any way.

EXAMPLES

Example 1: Preparation of tert-Butyl (2S)-2-[1-Bromo-8-[(4-methoxyphenyl)methylamino] imidazo [1,5-a]pyrazine-3-yl]pyrrolidine-1-carboxylate (5)

Into a reaction flask, 1-Bromo-N-[(4-methoxyphenyl) methyl]-3-[(2S)-pyrrolidin-2-yl] imidazo[1,5-a]pyrazin-8-amine monohydrate (6) (10 g), isopropyl ether (100 ml), triethylamine (2.4 g) were added at 25-30° C. and stirred for 5-10 min. Thereafter, di-tert-butyl dicarbonate (Boc anhydride) (6.23 g) was added and stirred for ~1 h at 25-35° C. After completion of the reaction, reaction mass was quenched with DM water and layers separated. Organic layer was concentrated under vacuum to afford (5) as oily product. Weight: 13.1 g. HPLC Purity: 99.19%

[1] HNMR (δ ppm; 400 MHz; DMSO-d$_6$): 7.65-7.66 (1H, d, 4.8 Hz); 7.26-7.28 (2H, d, 8.0 Hz); 7.05-7.06 (1H, d, 4.8 Hz); 6.84-6.89 (1H, m); 6.84-6.89 (2H, m); 5.15-5.21 (1H, m); 4.58-4.69 (2H; m); 3.72 (3H, s); 3.39-3.52 (2H, m); 2.15-2.30 (1H, m); 2.05-2.10 (1H, m); 1.83-1.97 (2H, m); 1.34 & 0.99 (9H, s)

[13] CNMR (δ ppm; 100 MHz; DMSO-d$_6$): 158.17; 152.81 (153.54); 149.33 (146.17); 142.54 (141.94); 131.31; 128.40; 128.16 (128.03); 114.22 (114.55); 113.69; 106.58 (106.92); 105.46; 78.29 (78.82); 54.97; 52.03 (51.85); 46.34; 42.87; 31.15 (31.25); 27.62 (28.04); 23.23 (22.75)

Mass: m/z 502.05, [M+H]$^+$

IR (λ, cm-1; neat): 3422 (N—H str.); 3063 (Aromatic C—H str.); 2975, 2933 (Aliphatic C—H str.); 1694 (C═O str.); 1613 (N—H Bending); 1249, 1173, 1068 (C—O str.)

Example 2: Preparation of tert-butyl (2S)-2-[8-[(4-methoxyphenyl) methylamino]-1-[4-(2-pyridylcarbamoyl)phenyl]imidazo[1,5-a]pyrazin-3-yl] pyrrolidine-1-carboxylate (4)

Into a reaction flask, 1,4-dioxane (300 ml), 1-Bromo-N-[(4-methoxyphenyl)methyl]-3-[(2S)-pyrrolidin-2-yl] imidazo[1,5-a]pyrazin-8-amine monohydrate (6), (100 g), were added and stirred for 10 min. Later, Triethylamine (24.0 g) followed by di-tert-butyl dicarbonate (Boc anhydride) (62.30 g) were added at 25-35° C. and maintained for ~1 h. After completion of reaction, 1,4-dioxane (200 ml), N-2-Pyridinyl-4-(4,4,5,5-tetramethyl-1,3,2-dioxaborolan-2-yl) benzamide (7) (93 g), potassium carbonate (98.60 g) and DM water (100 ml) were added at 25-35° C. Nitrogen gas was purged into the reaction mass for 10 min. and then, [Pd(dppf)Cl$_2$]. DCM Complex (4.85 g) was added. The reaction mass was heated to 80-85° C. and maintained at 80-85° C. for ~3 h. After completion of reaction, the reaction mass was cooled, DM water was added and separated the organic layer. Partial quantity of organic layer was concentrated under vacuum and purified by column chromatography to afford tert-butyl(2S)-2-[8-[(4-methoxyphenyl)methylamino]-1-[4-(2-pyridylcarbamoyl)phenyl]imidazo[1,5-a]pyrazin-3-yl] pyrrolidine-1-carboxylate (4) for structure characterization purpose. Remaining organic layer was used in the next without further isolation.

HPLC Purity: 95.92%

[1] HNMR (δ ppm; 400 MHz; DMSO-$d_6$): 10.80 (1H, s); 8.39-8.41 (1H, m); 8.20-8.22 (1H, d, 8.4 Hz); 8.12-8.14 (2H, d, 8.4 Hz); 7.83-7.88 (1H, m); 7.69-7.71 (2H, m); 7.69-7.71 (1H, d, 8.4 Hz); 7.22-7.28 (2H, m); 7.14-7.19 (1H, m); 7.14-7.19 (1H, m); 6.86-6.88 (2H, d, 8.4 Hz); 6.02-6.03 (1H, m); 5.25-5.33 (1H, m); 4.54-4.56 (2H, d, 5.6 Hz); 3.70 (3.92) (3H, s); 3.43-3.60 (2H, m); 2.12-2.36 (2H, m); 2.01-2.07 (1H, m); 1.89-1.94 (1H, m); 0.98 (1.36) (9H, s).

[13] CNMR (δ ppm; 100 MHz; DMSO-$d_6$): 165.48; 158.15; 153.01 (153.68); 152.17; 150.04; 147.92; 142.73 (142.14); 138.09; 138.02; 132.66 (132.89); 131.26; 128.98; 128.56; 128.48; 128.34; 127.56 (127.32); 119.80; 114.75; 113.65; 106.49 (106.83); 78.19 (78.75); 54.96; 52.41 (52.12); 46.44; 43.34; 32.44 (31.23); 27.66 (28.09); 23.36 (24.09)

Mass: m/z 620.07, [M+H]$^+$

IR (λ, cm-1; neat): 3429 (N—H str.); 3062 (Aromatic C—H str.); 2973, 2931 (Aliphatic C—H str.); 1683 (C=O str.); 1608, 1577 (N—H Bending); 1245, 1156, 1090 (C—O str.)

Example 3: Preparation of 4-[8-[(4-methoxyphenyl)methylamino]-3-[(2S)-2-pyrrolidinyl] imidazo[1,5-a]pyrazin-1-yl]-N-2-pyridinylbenzamide (3)

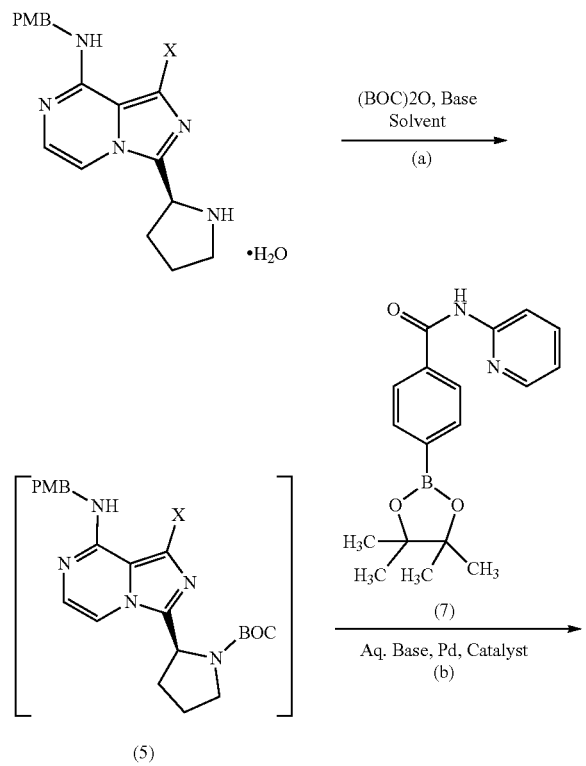

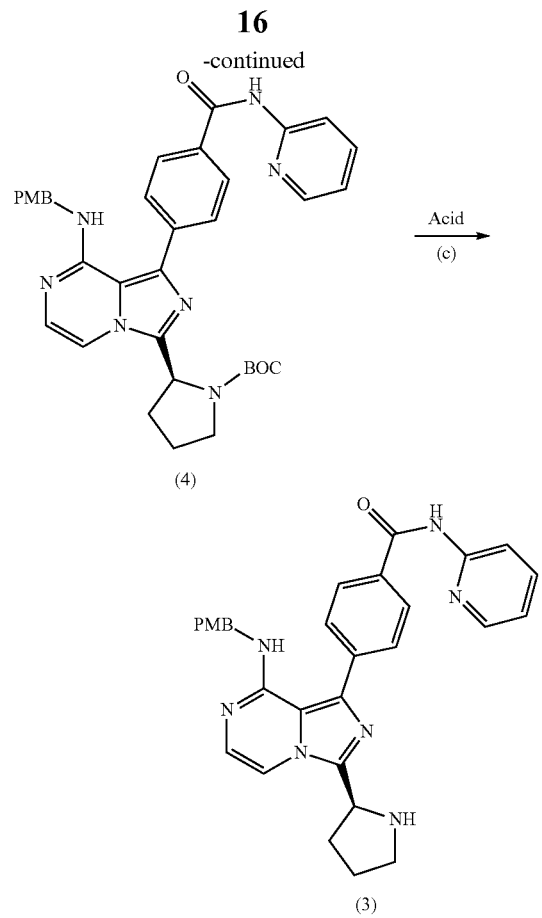

1-Bromo-N-[(4-methoxyphenyl)methyl]-3-[(2S)-pyrrolidin-2-yl]imidazo[1,5-a]pyrazine-8-amine monohydrate (6), (200 gm) and 1,4-dioxane (600 ml) were added into the reaction flask. Trimethylamine (49 gm) was added into the reaction at 25-35° C. followed by BOC anhydride (125 gm). The reaction mass was stirred at 25-30° C. After completion of the reaction, N-2-Pyridinyl-4-(4,4,5,5-tetramethyl-1,3,2-dioxaborolan-2-yl)benzamide (7), (169.70 g), 1,4-dioxane (400 ml), Potassium carbonate (197.30 g) and DM water (200 ml) were added and purged with nitrogen gas. Later, [Pd(dppf)Cl$_2$].DCM complex (9.70 g) was added and stirred for ~3 h at 80-85° C. After completion of the reaction, cooled and DM water was added. The organic layer was further treated with diluted hydrochloric acid (250 ml) at 50-55° C. for ~2 h. After completion of the reaction, solvent was distilled under vacuum. To the concentrated reaction mass, DM water and Methylene chloride were added and basified with aqueous sodium carbonate. Product was extracted with methylene chloride. Combined methylene chloride layer was concentrated under vacuum to afford the crude product (3). The product was further purified from N,N-Dimethylformamide-IPA mixture. Weight: 191.4 g;

HPLC Purity: 99.91%

[1] HNMR (δ ppm; 400 MHz; DMSO-$d_6$): 10.80 (1H, s); 8.39-8.41 (1H, m); 8.20-8.22 (1H, d, 8.4 Hz); 8.12-8.17 (2H, d, 8.4 Hz); 7.83-7.88 (1H, m); 7.77-7.78 (1H, d, 4.8 Hz); 7.72-7.74 (2H, d, 8.4 Hz); 7.25-7.27 (2H, d, 8.8 Hz); 7.16-7.17 (1H, m); 7.12-7.14 (1H, d, 4.8 Hz); 6.86-6.88 (2H, m); 6.00-6.03 (1H, t, 5.6 Hz); 4.53-4.57 (1H, m); 4.53-4.57 (2H, m); 3.70 (3H, s); 3.00 (1H, br); 2.87-2.91 (2H, t, 6.8 Hz); 2.22-2.29 (1H, m); 2.06-2.15 (1H, m); 1.85-1.91 (1H, m); 1.72-1.79 (1H, m);

¹³CNMR (δ ppm; 100 MHz; DMSO-d$_6$): 165.49; 158.14; 152.18; 150.02; 147.92; 143.04; 138.12; 138.09; 132.45; 131.84; 131.28; 128.98; 128.56; 128.25; 127.08; 119.79; 114.76; 114.67; 113.65; 107.28; 54.96; 54.15; 46.61; 43.36; 29.50; 25.82.

Mass: m/z 520.19, [M+H]+,

IR (λ, cm-1; neat): 3429; 3301 (N—H str.); 3060 (Aromatic C—H str.); 2952, 2871 (Aliphatic C—H str.); 1681 (C=O str.); 1608, 1576 (N—H Bending); 1240, 1036 (C—O str.)

Example 4: Preparation of 4-[8-[(4-Methoxyphenyl)methylamino]-3-[(2S)-1-(1-oxo-2-butyn-1-yl)-2-pyrrolidinyl]imidazo[1,5-a]pyrazin-1-yl]-N-2-pyridinylbenzamide (2)

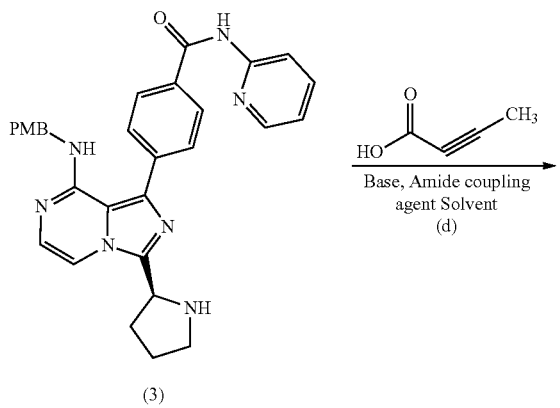

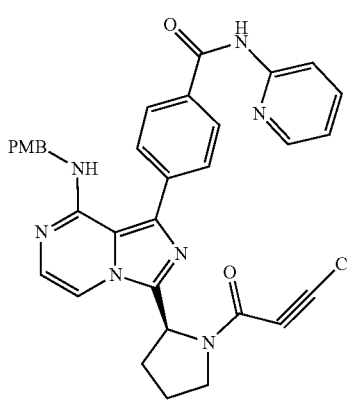

Into a reaction flask, N,N-Dimethylformamide (595 ml), 4-[8-[(4-methoxy phenyl)methylamino]-3-[(2S)-2-pyrrolidinyl]imidazo[1,5-a]pyrazin-1-yl]-N-2-pyridinylbenzamide (3) (85 gm), 1-Hydroxybenzotriazole (5.53 g), 2-Butynoic acid (15.12 g) and 1-Ethyl-3-(3-dimethylaminopropyl)carbodiimide hydrochloride (EDC.HCl) (40.76 g) and N,N-diisopropylethylamine (37.71 g) were added and maintained the reaction mass at 35-40° C. for ~1 h. After completion of reaction, the reaction mass was quenched into DM water and the resulting crude product was filtered. The crude product was further purified form IPA-MTBE mixture.

Weight: 82.1 g; HPLC Purity: 99.6%

¹HNMR (δ ppm; 400 MHz; DMSO-d$_6$): 10.812 (10.819) (1H, s); 8.39-8.41 (1H, m); 8.20-8.22 (1H, d, 8.4 Hz); 8.12-8.15 (2H, m); 7.83-7.88 (1H, m); 7.78-7.79 (1H, d, 5.2 Hz); 7.70-7.74 (2H, m); 7.25-7.28 (2H, m); 7.16-7.21 (1H, m); 7.16-7.21 (1H, m); 6.86-6.89 (2H, m); 6.03-6.06 (6.11-6.14) (1H, t, 5.6 Hz); 5.46-5.49 (5.71-5.73) (1H, dd, 6.8, 3.6 Hz); 4.49-4.60 (2H, m); 3.80-3.83 (1H, t, 6.8 Hz); 3.703 (3.705) (3H, s); 3.57-3.66 (1H, m); 2.10-2.41 (2H, m); 2.10-2.41 (1H, m); 2.01 (1.62) (3H, s); 1.92-2.07 (1H, m).

¹³CNMR (δ ppm; 100 MHz; DMSO-d$_6$): 165.48; 158.15; 152.17; 151.74; 149.97 (150.09); 147.92; 141.10 (141.97); 138.09; 137.78 (137.90); 132.76 (133.29); 132.60 (132.65); 131.25; 129.06; 128.55 (128.59); 128.28; 127.48 (124.96); 119.81; 114.76; 113.92 (113.84); 113.65; 106.90 (106.30); 88.25 (87.44); 74.27 (74.13); 54.96; 51.25 (53.65); 48.22 (45.86); 43.39; 31.16 (32.24); 23.87 (22.77); 3.22 (3.16).

Mass: m/z 586.12, [M+H]⁺

IR (λ, cm-1; neat): 3440; 3246 (N—H str.); 3107, 3067 (Aromatic C—H str.); 2990, 2953 (Aliphatic C—H str.); 2232 (—C≡C str.); 1679, 1664 (C=O str.); 1613, 1542 (N—H Bending); 1242, 1033 (C—O str.)

Example 5: Preparation of 4-{8-amino-3-[(2S)-1-(but-2-ynoyl)pyrrolidin-2-yl]imidazo[1,5-a]pyrazin-1-yl}-N-(pyridine-2-yl)benzamide (1; Acalabrutinib) as dihydrate 4-[8-[(4-Methoxyphenyl)methylamino]-3-[(2S)-1-(1-oxo-2-butyn-1-yl)-2-pyrrolidinyl] imidazo[1,5-a]pyrazin-1-yl]-N-2-pyridinylbenzamide (2) (150 gm), toluene (2250 ml) and Methanesulfonic acid (2250 ml) were added to the reaction flask and stirred for ~72 h at ~50° C. After completion of the reaction, cooled and separated the layer. Further, the methanesulfonic acid layer was quenched into the mixture of DM water, methylene chloride and ammonia solution. The organic layer was separated, treated with activated carbon and concentrated under vacuum to afford the crude Acalabrutinib (1). The crude product was further purified from aqueous isopropyl alcohol to afford crystalline Acalabrutinib (1) as dihydrate.

Weight: 84.3 g; HPLC Purity: 99.79%.

¹HNMR (δ ppm; 400 MHz; DMSO-d$_6$): 10.85 (1H, s); 8.40-8.41 (1H, m); 8.21-8.24 (1H, m); 8.15-8.17 (2H, m); 7.84-7.88 (1H, m); 7.79-7.80 (7.84-7.88) (1H, d, 4.8 Hz); 7.72-7.75 (2H, m); 7.15-7.20 (1H, m); 7.11-7.13 (7.15-7.20) (1H, d, 4.8 Hz); 6.14 (6.20) (2H, br); 5.46-5.49 (5.70-5.73) (1H, dd, 7.2, 4.0 Hz); 3.81-3.84 (3.56-3.63) (2H, t, 6.8 Hz), 2.21-2.42 (1H, m); 2.21-2.42 (1H, m); 2.01 (1.62) (3H, s); 1.94-2.14 (1H, m); 1.94-2.14 (1H, m).

¹³CNMR (δ ppm; 100 MHz; DMSO-d$_6$): 165.72; 152.23; 151.84 (151.88); 151.51 (151.66); 147.98; 141.05 (141.94); 138.16; 137.96 (137.85); 133.27 (133.82); 132.79 (132.83); 129.12; 128.35; 127.88; 119.85; 114.78; 113.87 (113.76); 107.02 (106.40); 88.35 (87.51); 74.32 (74.14); 51.34 (53.71); 48.29 (45.95); 31.19 (32.31); 23.93 (22.86); 3.28 (3.19)

Mass: m/z 466.22, [M+H]⁺ (as anhydrous)

IR (λ, cm-1; neat): 3446; 3287 (N—H str.); 3117, 3069 (Aromatic C—H str.); 2970 (Aliphatic C—H str.); 2245 (—C≡C str.); 1671 (C=O str.); 1606 (N—H Bending).

Example 6: Preparation of 4-{8-amino-3-[(2S)-1-(but-2-ynoyl)pyrrolidin-2-yl]imidazo[1,5-a]pyrazin-1-yl}-N-(pyridine-2-yl)benzamide (1; Acalabrutinib)

4-[8-[(4-Methoxyphenyl)methylamino]-3-[(2S)-1-(1-oxo-2-butyn-1-yl)-2-pyrrolidinyl] imidazo[1,5-a]pyrazin-1-yl]-N-2-pyridinylbenzamide (2; 60 g), toluene (900 ml) and Methanesulfonic acid (900 ml) were added to the reaction flask and stirred for ~72 h at +−50° C. After completion of the reaction, cooled and separated the layer. Further, the methanesulfonic acid layer was quenched into the mixture of DM water, methylene chloride and ammonia solution. The organic layer treated with activated carbon and concentrated under vacuum to afford the crude Acalabrutinib (1). The crude product was further purified from isopropyl alcohol to afford crystalline Acalabrutinib (1). Weight: 38.7 g; HPLC Purity: 99.3%.

Example 7: Preparation of Methyl 4-bromobenzoate (9)

4-Bromobenzoic acid (10) (50 gm) and methanol (200 ml) were added into the reaction flask. To this thionyl chloride (5.9 g) was added, heated and stirred for 5 h at reflux temperature. After completion of the reaction, methanol was distilled and the resulting slurry was cooled to ~0° C. Later the product was filtered and dried.

Weight: 48.1 g; HPLC Purity: 99.69%.

Example 8: Preparation of 4-Bromo-N-(2-pyridyl)benzamide (8)

Methyl 4-bromobenzoate (9); (40 gm), 2-Aminopyridine (17.5 g) and toluene (400 mL) were added into the reaction flask. To this, 25% w/w sodium methoxide solution (48 ml) was added, heated to 90-95° C. and stirred for 3 h. After completion of the reaction, reaction mass was cooled, DM water (250 ml) and ethyl acetate (120 ml) were added and separated the layers. The organic layer was concentrated under vacuum and the resulting residue was treated with cyclohexane, later the product was filtered and dried.

Weight: 43.1 g;
HPLC Purity: 99.127%.

Example 9: Preparation of N-(2-pyridyl)-4-(4,4,5,5-tetramethyl-1,3,2-dioxaborolan-2-yl)benzamide (7)

4-Bromo-N-(2-pyridyl)benzamide (8) (40 gm), Bis(pinacolato)diboron (44 g), Potassium acetate (22.6 g), Tetrakis (Triphenylphosphine)palladium(0) (1.2 g) and 1,4-dioxane (200 ml) were added, heated the reaction mass to 90-95° C. and stirred for ~5 h. After completion of the reaction, reaction mass was cooled and distilled the solvent under vacuum and the resulting mass was cooled to 25-30° C. To this DM water and ethyl acetate were added and separated the layers. The organic layer was concentrated under vacuum and the resulting crude was further purified from methanol. Weight: 38.2 g;
HPLC Purity: 99.789%.

We claim:

1. A process for the preparation of Acalabrutinib of Formula (1):

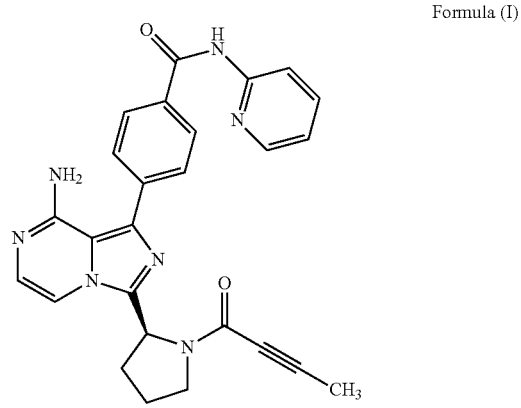 [SMILES: CC#CC(=O)N1CCC[C@H]1c1nc(-c2ccc(C(=O)Nc3ccccn3)cc2)c2c(N)nccn12]

Formula (I)

wherein the process comprises the following steps:

(a) reacting a compound of formula (6):

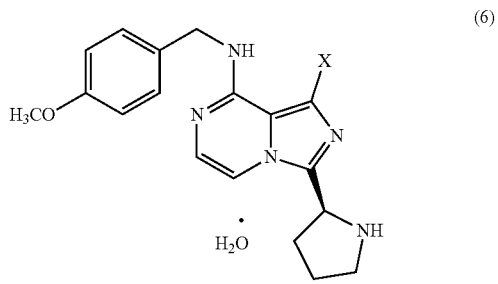

(6)

wherein:
X is Cl, Br, or I;
with a compound of the following formula:

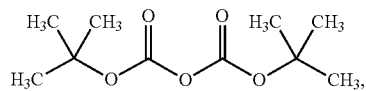

in the presence of a base, to obtain a compound of formula (5):

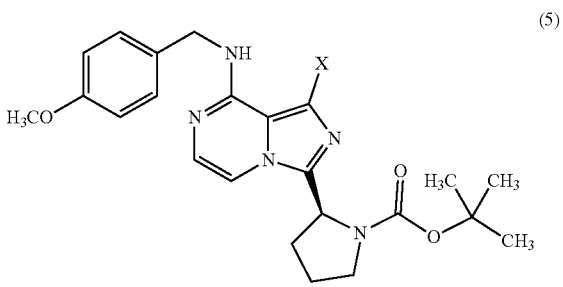

(5)

wherein:

X is Cl, Br, or I;

(b) reacting the compound of formula (5) obtained in step (a) above in-situ with a compound of formula (7):

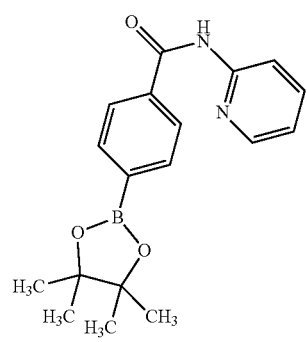

(7)

in the presence of a base and a palladium catalyst, in an aqueous organic solvent, to obtain a compound of formula (4):

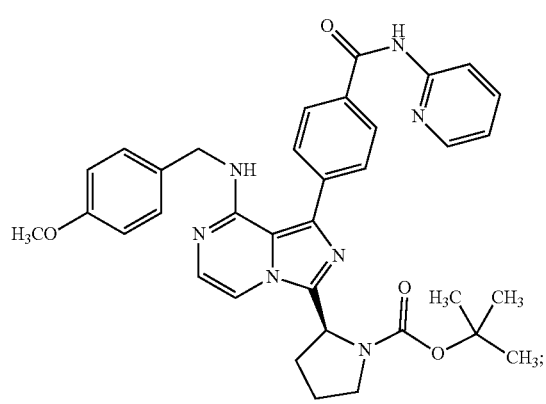

(4)

(c) selectively deprotecting the compound of formula (4) obtained in step (b) above in-situ with dilute or concentrated acid, in an organic solvent, to obtain a compound of formula (3):

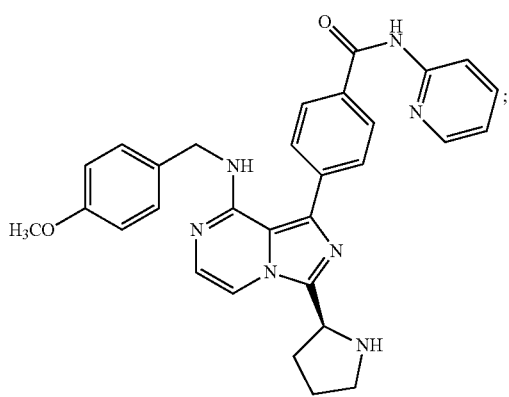

(3)

(d) reacting the compound of formula (3) obtained in step (c) above with a compound of the following formula:

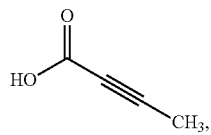

in the presence of a base and an amide coupling reagent, in an organic solvent, to obtain a compound of formula (2):

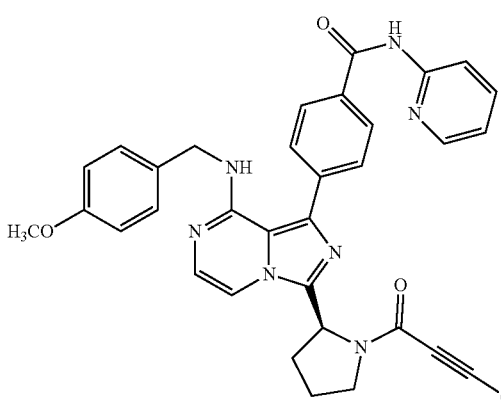

(2)

(e) deprotecting the compound of formula (2) obtained in step (d) above in the presence of an acid, to obtain Acalabrutinib of Formula (1):

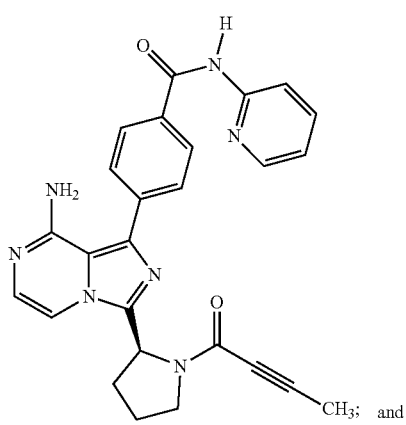

Formula (1)

and (f) optionally purifying Acalabrutinib of Formula (1) in a suitable solvent system, to obtain pharmaceutically pure Acalabrutinib having a purity of greater than 99% as determined by high performance liquid chromatography (HPLC).

2. The process as claimed in claim 1, wherein:

(i) in step (a) and step (b), the base is an organic base selected from the group consisting of diisopropylethylamine, tributylamine, and triethylamine, or an inorganic base selected from the group consisting of sodium acetate, sodium bicarbonate, sodium carbonate, potassium acetate, potassium bicarbonate, potassium carbonate, and cesium carbonate; or
(ii) in step (b), the palladium catalyst is selected from the group consisting of Pd(PPh$_3$)$_4$, Pd(dppf)Cl$_2$, Pd(dppf)Cl$_2$DCM complex, Pd(OAc)$_2$, PdCl$_2$, Pd(PhCN)$_2$Cl$_2$, Pd(PPh$_3$)$_2$Cl$_2$, and [PdCl(C$_3$H$_5$)]$_2$; or
(iii) in step (c), the acid is an organic acid selected from the group consisting of methanesulfonic acid, trifluoroacetic acid, triflic acid, and p-toluenesulfonic acid, or an inorganic acid selected from the group consisting of dilute or concentrated hydrochloric acid, dilute or concentrated hydrobromic acid, and hydrobromic acid in acetic acid; or
(iv) in step (d), the base is an organic base selected from the group consisting of triethylamine, diisopropylethylamine, and tert-butylamine, or an inorganic base selected from the group consisting of sodium acetate, sodium bicarbonate, sodium carbonate, potassium acetate, potassium bicarbonate, potassium carbonate, and cesium carbonate; or
(v) in step (d), the amide coupling reagent is selected from the group consisting of (benzotriazol-1-yloxy)tris(dimethylamino)phosphonium hexafluorophosphate (BOP), (benzotriazol-1-yl-oxytripyrrolidino)phosphonium hexafluorophosphate (PyBOP), hexafluorophosphate benzotriazole tetramethyl uronium (HBTU), hexafluorophosphate azabenzotriazole tetramethyl uronium (HATU), 2-(1H-benzotriazol-1-yl)-1,1,3,3-tetramethylaminium tetrafluoroborate (TBTU), 1-ethyl-3-(3-dimethylaminopropyl) carbodiimide (EDCI), N,N'-dicyclohexylcarbodiimide (DCC), 1,1'-carbonyldiimidazole (CDI), N,N'-diisopropylcarbodiimide (DIC), N-(3-dimethylaminopropyl)-N-ethylcarbodiimide hydrochloride (EDC.HCl), and 1-hydroxybenzotriazole (HOBt); or
(vi) in step (d), the organic solvent is selected from the group consisting of dichloromethane, chloroform, toluene, ethyl acetate, tetrahydrofuran, 1,4-dioxane, acetonitrile, N,N-dimethylformamide (DMF), N,N-dimethylacetamide (DMAc), 1,3-dimethyl-2-imidazolidinone (DMI), 2-methyltetrahydrofuran (2-MeTHF), N-methylpyrrolidone (NMP), and dimethyl sulfoxide (DMSO), or a mixture thereof; or
(vii) in step (e), the acid is an organic acid selected from the group consisting of methanesulfonic acid, trifluoroacetic acid, triflic acid, p-toluenesulfonic acid, and cyanuric acid, or an inorganic acid selected from the group consisting of dilute or concentrated hydrochloric acid, dilute or concentrated hydrobromic acid, hydrobromic acid in acetic acid, perchloric acid, and ceric ammonium nitrate;
or a combination thereof.

3. The process as claimed in claim 1, wherein step (b) of the process further comprises preparing the compound of formula (7) using the following additional steps:
(b1) reacting a compound of formula (10):

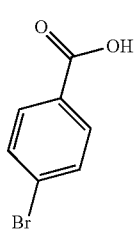

(10)

with an alcohol, in the presence of an acid catalyst, to obtain a compound of formula (9):

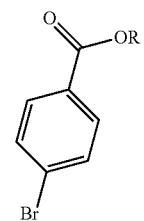

(9)

wherein:
R is CH$_3$, CH$_2$CH$_3$, or CH(CH$_3$)$_2$;

(b2) reacting the compound of formula (9) obtained in step (b1) above with a compound of the following formula:

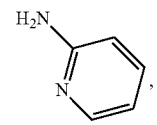

in the presence of a base and an organic solvent, to obtain a compound of formula (8):

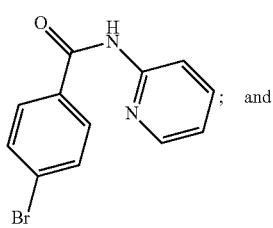

(8)

; and (b3) reacting the compound of formula (8) obtained in step (b2) above with a compound of the following formula:

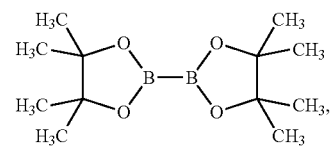

in the presence of a base, a palladium catalyst, and a solvent, to obtain the compound of formula (7):

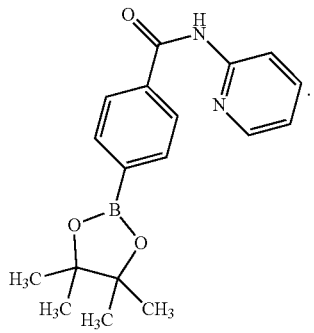

(7)

4. The process as claimed in claim 3, wherein:
(i) in step (b1), the alcohol is selected from the group consisting of methanol, ethanol, and isopropanol, and the acid catalyst is selected from the group consisting of thionyl chloride, oxalyl chloride, phosphorous oxychloride, concentrated hydrochloric acid, sulphuric acid, p-toluenesulfonic acid, and methanesulfonic acid; or
(ii) in step (b2), the base is selected from the group consisting of sodium methoxide, sodium ethoxide, and potassium tert-butoxide, and the organic solvent is selected from the group consisting of methanol, ethanol, isopropanol, toluene, and xylene, or a mixture thereof; or
(iii) in step (b3), the base is an organic base selected from the group consisting of triethylamine, diisopropylethylamine, and tert-butylamine, or an inorganic base selected from the group consisting of sodium acetate, sodium bicarbonate, sodium carbonate, potassium acetate, potassium bicarbonate, potassium carbonate, cesium carbonate, magnesium acetate, and calcium acetate; or
(iv) in step (b3), the palladium catalyst is selected from the group consisting of $Pd(PPh_3)_4$, $Pd(dppf)Cl_2$, $Pd(dppf)Cl_2$, DCM complex, $Pd(OAc)_2$, $PdCl_2$, $Pd(PhCN)_2Cl_2$, $Pd(PPh_3)_2Cl_2$, and $[PdCl(C_3H_5)]_2$; or
(v) in step (b3), the solvent is selected from the group consisting of N,N-dimethylformamide (DMF), dimethyl sulfoxide (DMSO), hexane, heptane, toluene, xylene, methyl tert-butyl ether, tetrahydrofuran, 2-methyltetrahydrofuran (2-MeTHF), 1,4-dioxane, dichloromethane, and chloroform;
or a combination thereof.

5. The process as claimed in claim 3, wherein the compound of formula (7) is optionally purified from a solvent selected from the group consisting of acetone, methanol, ethanol, isopropanol, and acetonitrile.

6. The process as claimed in claim 1, wherein the process further comprises obtaining pharmaceutically pure Acalabrutinib having a purity of greater than 99.5% as determined by high performance liquid chromatography (HPLC).

* * * * *